Patented Dec. 28, 1937

2,103,736

UNITED STATES PATENT OFFICE 2,103,736

ALKYL DERIVATIVES OF PHENOLS AND A METHOD OF PRODUCING THE SAME

Siegfried Skraup, Wurzburg, Germany, assignor to Schering-Kahlbaum A. G., Berlin, Germany, a corporation of Germany No Drawing. Original application July 15, 1936, Serial No. 90,723. Divided and this application March 9, 1937, Serial No. 129,811. In Germany June 13, 1933

13 Claims. (Cl. 260—154)

This invention relates to derivatives of phenols and more particularly to O- and C-alkyl derivatives of phenols and a method of producing the same. The present application is a division of my co-pending application Serial No. 90,723, filed July 15, 1936, and entitled "Acyl derivatives of phenols and a method of producing same".

As is known, phenols in contrast to the alcohols cannot in general be condensed with alcohols.

It has now been found that in the presence of heteropoly acids and even in far less than stoichiometrical quantitative proportions, alcohols may very easily be condensed wtih phenols, water being split off and alkylation taking place in accordance with the following reaction scheme:—

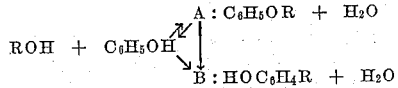

According to the constitution of the components, the heteropoly acids selected, and the experimental conditions, alkylation takes place in varying proportions in the hydroxyl groups—thus with the formation of an ether (reaction A)—and in the nucleus—with the formation of an alkyl phenol (reaction B).

Since in the presence of the heteropoly acid the reaction A is reversible as shown above, but the reaction B is practically not so, it is rendered possible to start instead of from phenol and alcohol from a prepared ether and to convert this into the alkylphenol.

An advantage of the new invention with respect to other proposed processes lies in the fact that the alkylphenol can be made the main product of the reaction, and the technically valuable alkylphenol predominates in the mixtures formed by the reaction.

Thus, in accordance with one feature of the invention, phenols are condensed with alcohols in the presence of a heteropoly acid.

According to a further feature of the invention, to prepare nuclear alkyl derivatives of phenols, the alkyl ethers of phenols are transformed in the presence of a heteropoly acid.

The use of the heteropoly acids instead of the means previously employed in such cases is to be valued as a technical advance not only over the employment of the water-sensitive strong condensation agents necessary at least in equivalent quantities and mostly in excess, like sulphuric acid, aluminum chloride etc., since the present process renders it possible to work in the presence of water with small (catalytic) quantities of the heteropoly acids which are again precipitated unchanged. It is also of advantage over the occasional use of surface catalysts since it renders it possible to work in a homogeneous system which yields many advantages, as, for example, besides the strict reproducibility of the results of individual preparations, also the attainment of a favorable ratio of isomers in the resulting mixtures.

The invention is illustrated by the following examples without, however, limiting the same to them:

Example 1

Into a mixture maintained at a temperature of about 160° C. of 100 parts of phenol and 5 parts of phosphomolybdic acid, methanol vapour is introduced. With the water vapour formed a large quantity of anisol (B. P. 154° C.) passes over which can easily be freed from excess methanol by fractionation and from any phenol which may be present by treatment with lyes.

Example 2

As in Example 1, 100 parts of m-cresol and 5 parts of phosphotungstic acid are treated with isopropyl alcohol; there is formed only little of the m-cresol isopropyl ether of B. P.$_{16}$ 80° C.; the main product is a mixture of the isomeric isopropyl m-cresols of M. P. 51° C., 48° C. (54° C.), 69° C., 112° C., which can be separated into its components by known methods. Of thymol itself 24% are obtained, of symm. thymol 14%, of the two isomers of M. P. 69° C. and 112° C. together about 62%.

Example 3

50 parts of m-cresyl isopropyl ether are maintained gently boiling with 3 parts of silicotungstic acid until a test portion shows itself to be completely soluble in alkali. By fractionation, as first runnings, some m-cresol is obtained, and as last runnings, higher propylated cresols; the main product may be separated into the isomeric isopropyl m-cresols mentioned in Example 5. By this means are formed 25% of thymol and 8.5% of symm. thymol together with the two isomers.

By the term heteropolyacids as used in the specification and the claims annexed hereto I understand compounds as they are known to chemists, the complex anion of which consists of a number of oxygen containing anionogenous radicals and molecules of which at least one differs in its composition from the others. Such heteropolyacids are besides those mentioned in the examples, for instance, boron tungstic acid, cerium molybdic acid, titanium molybdic acid, cobaltum molybdic acid, vanadium phosphotungstic acid, tellurium tungstic acid, and the like.

Of course, many changes and variations in the reaction conditions, the temperatures employed, the solvents used, the purification methods etc. may be made use of by those skilled in the art in accordance with the principles set forth herein and in the claims annexed hereto. By the term "a phenol" as used in the appended claims it is intended to cover phenol and its homologues, that is, phenol, cresol, naphthol, and the like.

What I claim is:

1. A method for the production of alkyl substitution products of phenols, comprising condensing an alcohol with a phenol in the presence of a heteropolyacid.

2. A method according to claim 1, wherein as heteropolyacid there is used a compound selected from the group of compounds consisting of sliicomolybdic acid, silicotungstic acid, phosphomolybdic acid and phosphotungstic acid.

3. A method according to claim 1, wherein 1 to 10% of heteropolyacid calculated on the weight of the reaction components are used as condensing agent.

4. A method for the production of a nuclear substitution product of phenols, comprising converting alkyl ethers of phenols into nuclear substitution products by reacting the former in the presence of a heteropolyacid.

5. A method according to claim 4, wherein as heteropolyacid there is used a compound selected from the group of compounds consisting of sliico-molybdic acid, silico tungstic acid, phosphomolybdic acid and phosphotungstic acid.

6. A method for the production of alkyl-substituted phenols, comprising heating an alcohol with an excess of a phenol in the presence of a heteropolyacid.

7. A method for the production of nuclear substitution products of phenols, comprising heating an alkyl ether of a phenol in the presence of a heteropolyacid and separating the rearranged nuclear substitution products from the reaction mixture.

8. A method for the production of thymols, comprising heating m-cresol with isopropyl alcohol in the presence of a heteropolyacid and separating the thymols from the reaction mixture.

9. A method according to claim 8, wherein the thymols isolated from the reaction mixture are separated into thymol and its isomers.

10. A method for the production of thymols, comprising heating m-cresol with isopropyl alcohol in the presence of phosphotungstic acid at a temperature of 160° C.

11. A method for the production of thymols, comprising heating to boiling m-cresyl isopropyl ether in the presence of a heteropolyacid and separating the formed thymols from the reaction mixture.

12. A method according to claim 11, wherein the thymols isolated from the reaction mixture are separated into thymol and its isomers.

13. A method for the production of thymols, comprising heating to boiling m-cresyl isopropyl ether in the presence of a silico tungstic acid.

SIEGFRIED SKRAUP.